US010306053B1

(12) United States Patent
Moeller

(10) Patent No.: US 10,306,053 B1
(45) Date of Patent: May 28, 2019

(54) RESTRICTING COMPUTING DEVICES USED BY VEHICLE OPERATORS

(71) Applicant: Posture Solutions, LLC, St. Louis, MO (US)

(72) Inventor: Trent Moeller, St. Louis, MO (US)

(*) Notice: Subject to any disclaimer, the term of this patent is extended or adjusted under 35 U.S.C. 154(b) by 0 days.

(21) Appl. No.: 15/953,883

(22) Filed: Apr. 16, 2018

Related U.S. Application Data

(60) Provisional application No. 62/486,241, filed on Apr. 17, 2017.

(51) Int. Cl.
*H04W 24/00* (2009.01)
*H04M 1/725* (2006.01)
*H04W 4/02* (2018.01)
*G06T 11/00* (2006.01)

(52) U.S. Cl.
CPC ....... *H04M 1/72577* (2013.01); *G06T 11/001* (2013.01); *H04M 1/72552* (2013.01); *H04M 1/72558* (2013.01); *H04M 1/72569* (2013.01); *H04M 1/72583* (2013.01); *H04W 4/023* (2013.01); *H04W 4/027* (2013.01)

(58) Field of Classification Search
CPC ..... H04W 4/027; H04W 4/046; H04W 48/04; H04W 4/02; H04W 64/006
USPC ....... 455/404.1, 404.2, 456.1–457; 340/539.13, 988–996; D10/104.2
See application file for complete search history.

(56) References Cited

U.S. PATENT DOCUMENTS

| 8,874,162 | B2 | 10/2014 | Schrader et al. | |
| 9,491,589 | B2 | 11/2016 | Schrader et al. | |
| 2011/0111724 | A1* | 5/2011 | Baptiste | H04M 1/6075 455/404.1 |
| 2015/0093993 | A1* | 4/2015 | Pierfelice | H04L 63/10 455/41.2 |
| 2016/0248906 | A1 | 8/2016 | Schrader et al. | |

\* cited by examiner

*Primary Examiner* — Ronald Eisner
(74) *Attorney, Agent, or Firm* — Stinson Leonard Street LLP

(57) ABSTRACT

Determining whether a user of a mobile computing device is designated as an operator of a vehicle and/or heavy machinery and restricting one or more functions of the device when the user is so designated. In an embodiment, a system restricts a display of visual information via an electronic visual display when the user claims an operator token and the speed of the device exceeds a predetermined threshold value.

13 Claims, 12 Drawing Sheets

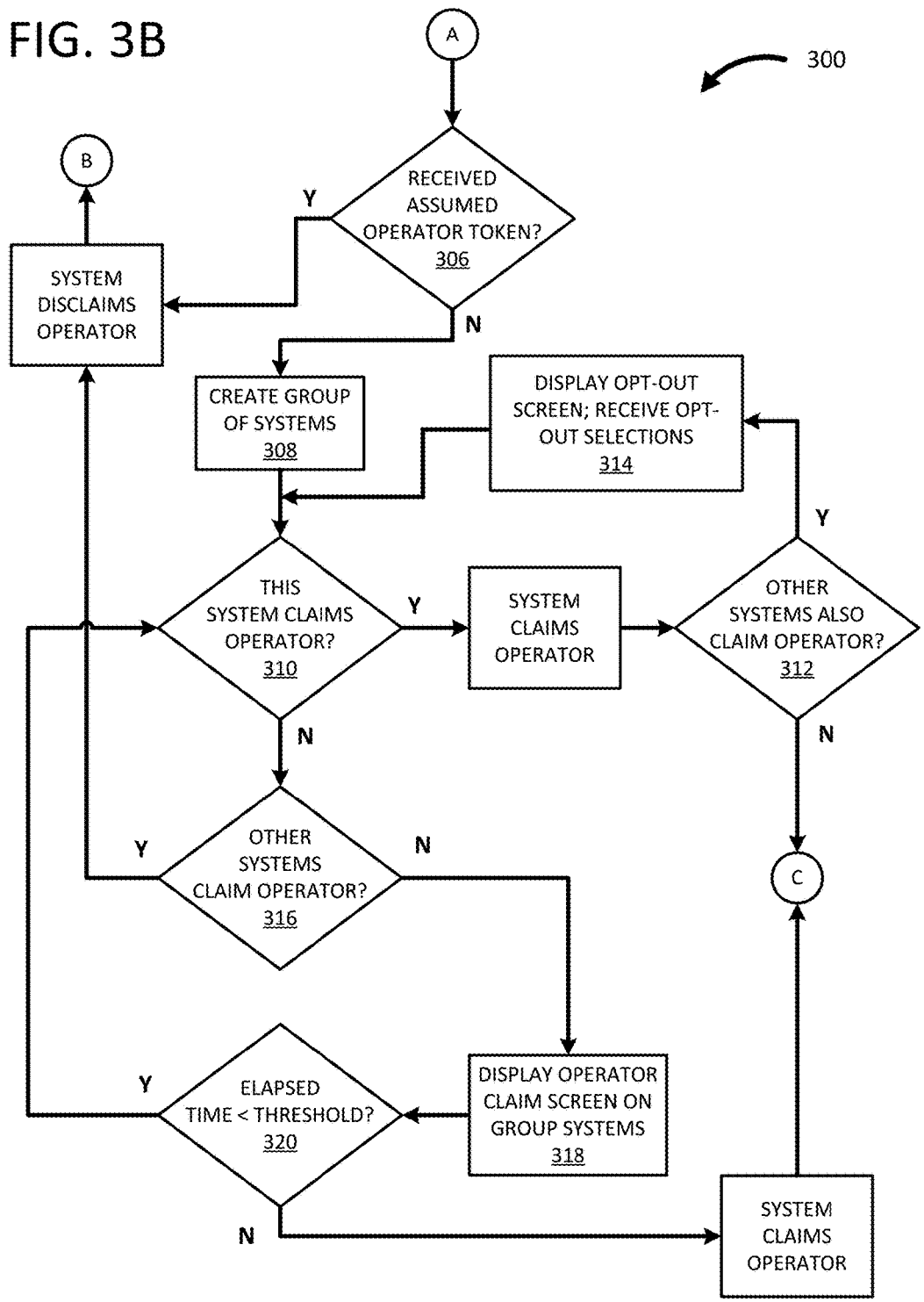

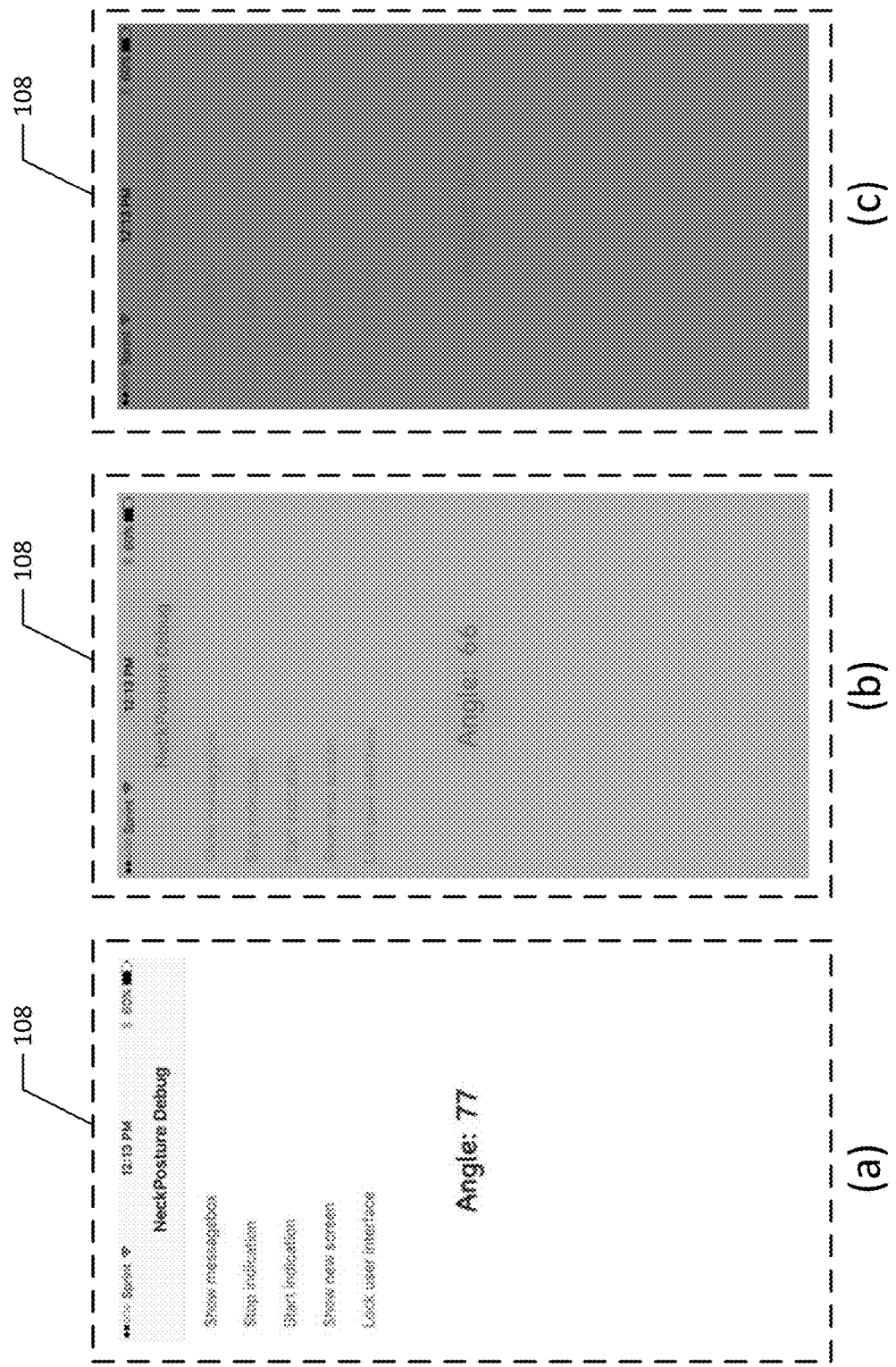

US 10,306,053 B1

RESTRICTING COMPUTING DEVICES USED BY VEHICLE OPERATORS

CROSS-REFERENCE TO RELATED APPLICATION

This application claims priority from U.S. Provisional Patent Application Ser. No. 62/486,241, filed Apr. 17, 2017, the entire contents of which are expressly incorporated herein by reference, including the contents and teachings of any references contained therein.

FIELD

Aspects of the present invention relate to the field of restricting functions of mobile computing devices.

BACKGROUND

Operators of vehicles and/or heavy machinery are susceptible to distractions from their mobile computing devices, such as smartphones and the like. Conventional mobile computing devices are unable to determine when the device users begin operating the vehicle and/or heavy machinery and accommodate situations in which multiple device users are present and could each possibly operate the vehicle and/or heavy machinery.

SUMMARY

Aspects of the invention relate to determining whether a user of a mobile computing device is designated as an operator of a vehicle and/or heavy machinery and restricting one or more functions of mobile computing device when the user is so designated.

A system embodying aspects of the invention includes an electronic visual display, a communications subsystem, a processor, and a memory device. The processor is communicatively coupled to the electronic visual display and the communications subsystem. The memory device stores processor-executable instructions. When executed by the processor, the instructions configure to the processor to restrict functions of the system when a user of the system is designated as a vehicle operator and a speed of the system exceeds a predetermined threshold value. The functions include execution of a messaging application, execution of a social media application, execution of a music application, and a display of visual information by the electronic visual display.

A method embodying aspects of the invention includes a mobile computing device claiming an operator token when the device is more than a predetermined distance from other mobile computing devices. A speed of the mobile computing device is determined. One or more functions of the device are restricted when the device claims the operator token and has a speed that exceeds a predetermined threshold value.

Another method embodying aspects of the invention includes a mobile computing device receiving a designated operator token from an operator beacon. In response to receiving the token, a user of the mobile computing device is designated as a passenger and all functions of the mobile computing device are allowed.

Yet another method embodying aspects of the invention includes creating a group from a plurality of mobile computing devices that are each within a predetermined distance of each other. Screens configured to claim an operator token are presented on electronic display devices of the mobile computing devices. When one of the devices claims the operator token within a predetermined time threshold value of creating the group and has a speed that exceeds a predetermined speed threshold value, that device has one or more functions restricted. When the operator token is unclaimed after expiration of the predetermined time threshold, each of the devices has one or more functions restricted.

Other objects and features will be in part apparent and in part pointed out hereinafter.

BRIEF DESCRIPTION OF THE DRAWINGS

FIGS. 3A and 3B illustrate an exemplary flowchart of a real-time process for claiming an operator token according to an embodiment.

FIGS. 4 and 5 illustrate a restriction of functions of a mobile computing device system according to an embodiment.

Corresponding reference characters indicate corresponding parts throughout the drawings.

DETAILED DESCRIPTION

Figure 1:
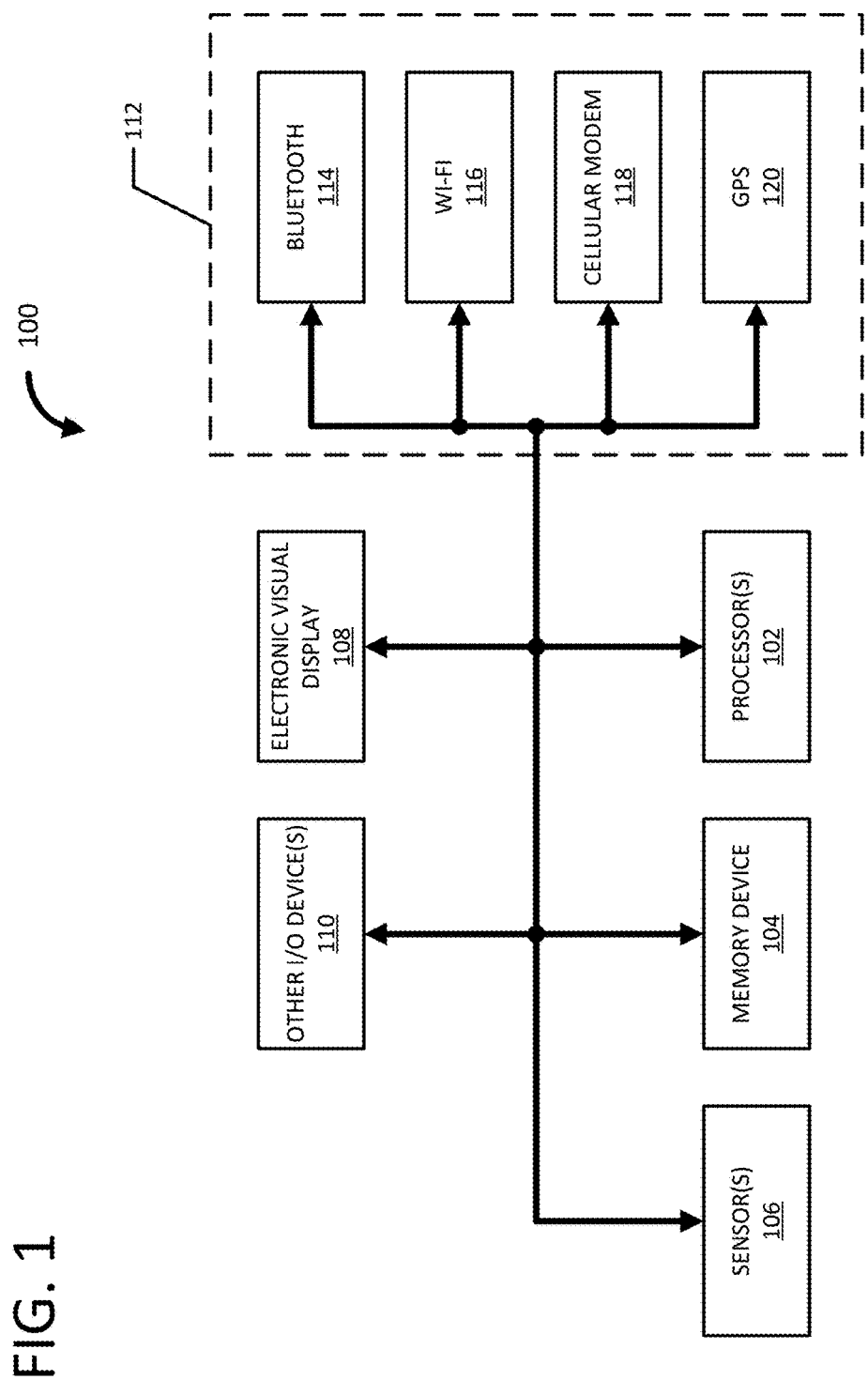
FIG. 1 is a block diagram of a mobile computing device system according to an embodiment.

FIG. 1 illustrates an exemplary mobile computing device system, generally indicated at 100, in accordance with an aspect of the invention. The system 100 includes one or more processors 102, a memory device 104, one or more sensors 106, an electronic visual display 108, one or more other input/output (I/O) devices 110, and a wireless communications subsystem 112. The wireless communications subsystem 112 includes, in an embodiment, at least one of a Bluetooth transceiver 114, a Wi-Fi transceiver 116, a cellular transceiver 118, and a Global Positioning System (GPS) receiver 120. Exemplary mobile computing device systems include, but are not limited to, a mobile phone, a tablet computing device, a smartphone, a smartwatch, and the like. In system 100, the processor(s) 102, memory device 104, sensor(s) 106, electronic visual display 108, other I/O devices 110, and wireless communications subsystem 112 are communicatively and/or electrically coupled.

The memory device 104 is configured to store processor-executable instructions that comprise at least one of an operating system, a software development kit (SDK), and an application that, when executed by processor 102, determine whether an operator of mobile computing device system 100 is designated as an operator of a vehicle and/or heavy machinery and restrict one or more functions of mobile computing device system 100 when the operator is so designated. In an embodiment, memory device 104 is configured to store an operator claiming token that designates mobile computing device system 100 as belonging to an operator of a vehicle and/or heavy machinery. In an embodiment, the token is an object (e.g., a location in memory device 104 having a value and referenced by an identifier) such as one or more of a variable, a data structure, a function, and a method, for example.

The sensor 106 is configured to determine the orientation of system 100 and provide a real-time indication of the orientation to processor 102. Exemplary sensors include, but are not limited to, a gyroscope, an accelerometer, an altimeter, a camera, and the like. In an embodiment, sensor 106 is internal to system 100 (e.g., sensor 108 utilizes a power source of system 100). In another embodiment, sensor 106 is external to system 100. For example, a sensor external to system 100 comprises sensor 106 integrated with a case or holder for system 100 (e.g., sensor 106 utilizes its own power source), in an embodiment.

The electronic visual display 108 is configured to present images, text, video, and the like to a viewer (e.g., a user of system 100, etc.). Exemplary electronic visual displays include, but are not limited to, screens, display devices, touchscreen display devices, and the like. The other I/O devices 110 are each configured to enable a human and/or other computing system to communication or interface with system 100. Exemplary I/O devices include, but are not limited to, a microphone, a speaker, universal serial bus (USB) interface, camera, on/off switch, subscriber identity module (SIM) interface, and the like.

The communication subsystem 112 is configured to enable system 100 to communicate with other systems, determine its speed, and/or coordinate designation of an operator token, as described more fully herein. In an embodiment, communication subsystem 112 includes radio frequency receivers and transmitters and/or optical receivers and transmitters configured to physically receive and transmit data in accordance with one or more communications protocols, such as those that operate according to the IEEE 802.15 protocol (e.g., Bluetooth), the IEEE 802.11 protocol (e.g., Wi-Fi), the Global System for Mobile Communications (GSM) standard, the Universal Mobile Telecommunications System (UMTS) standard, Code Division Multiple Access (CDMA) standards, and the like and/or combinations thereof.

Figure 2:
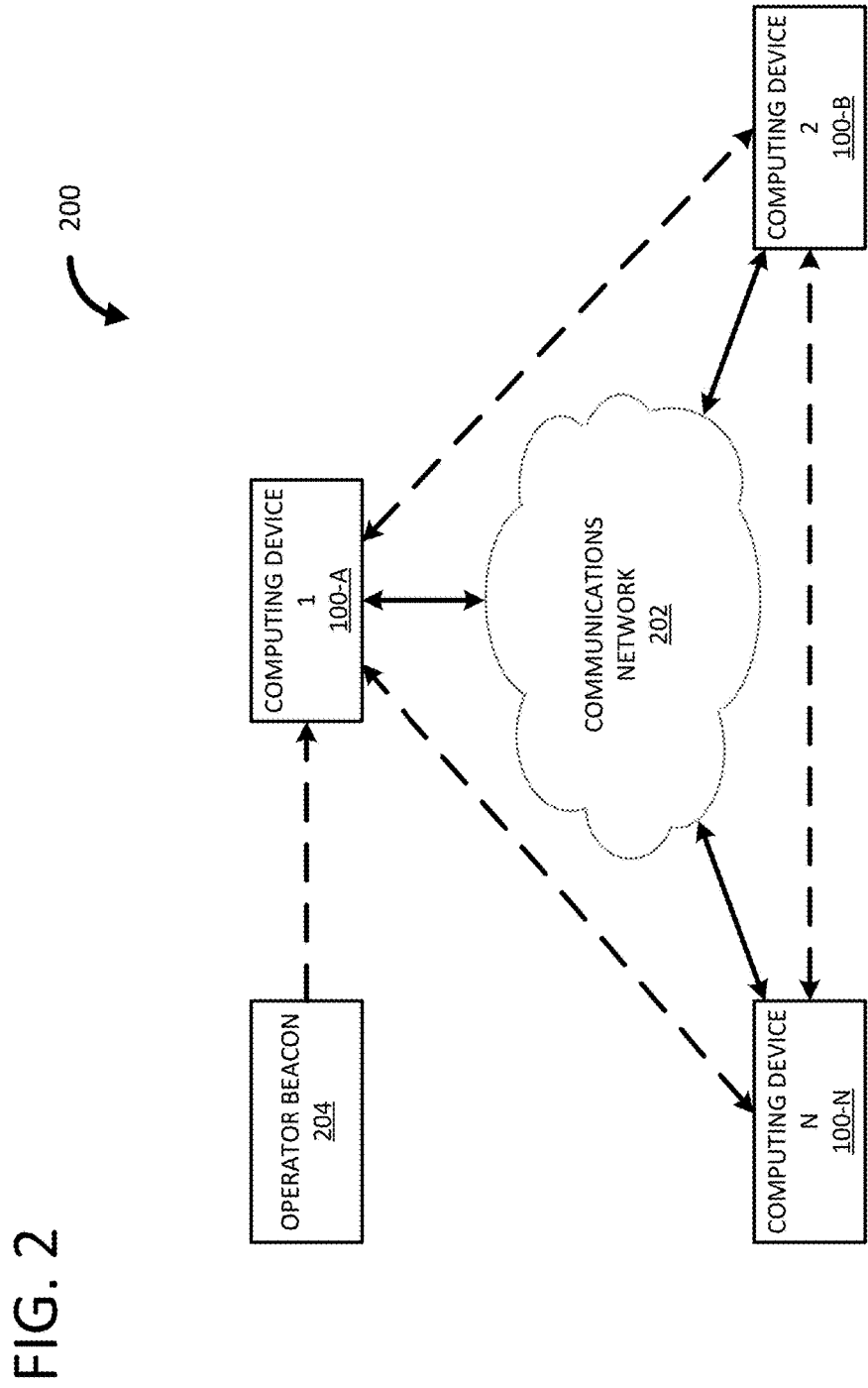
FIG. 2 is a block diagram of an operator token claiming system according to an embodiment.

FIG. 2 illustrates an exemplary operator claiming system, generally indicated at 200, in accordance with an aspect of the invention. The operator claiming system 200 includes mobile computing device systems 100, a communications network 202, and an operator beacon 204.

In an embodiment, the communications network 202 is capable of facilitating the exchange of data among various components of operator claiming system 200. The communications network 202 may include a personal area network (PAN), a local area network (LAN), and/or a wide area network (WAN) that is connectable to other telecommunications networks, including other PANs, LANs, and/or WANs, and/or portions of the Internet or an intranet. The communications network 206 may also be any telecommunications network that facilitates the exchange of data, such as those that operate according to the IEEE 802.3 (e.g., Ethernet), the IEEE 802.15 (e.g., Bluetooth), and/or the IEEE 802.11 (e.g., Wi-Fi) protocols, for example. In other embodiments, the communications infrastructure is any medium that allows data to be physically transferred through serial or parallel communication channels (e.g., copper wire, optical fiber, computer bus, wireless communication channel, cellular communications, etc.).

In an embodiment, the operator beacon 204 is configured to transmit electromagnetic radiation that includes an identifier designating a third-party vehicle operator. For example, operator beacon 204 installed on a public transportation system (e.g., taxi, bus, subway, train, airplane, etc.) transmits the identifier to mobile computing device systems 100 to designate the operator of the public transportation system as the claimed operator. Accordingly, mobile computing device systems 100 do not restrict any functions (e.g., are fully functional) while within range of the electromagnetic radiation emitted by operator beacon 204. In an embodiment, operator beacon 204 is a mobile computing device, such as a smartphone, a tablet, and the like of a vehicle operator (e.g., taxi driver, etc.). In another embodiment, operator beacon 204 is one or more dedicated radio frequency emitting devices that includes one or more processors, a memory device, and a radio frequency transmitter.

In an embodiment, mobile computing device systems 100 communicate with each other via communications network 202 to designate one of the systems as an operator system, as more fully described herein. In another embodiment, mobile computing device systems 100 communicate directly with each other, such as via a personal area network (e.g., Bluetooth, etc.), to designate one of the systems as an operator system, as more fully described herein.

Figure 3A:
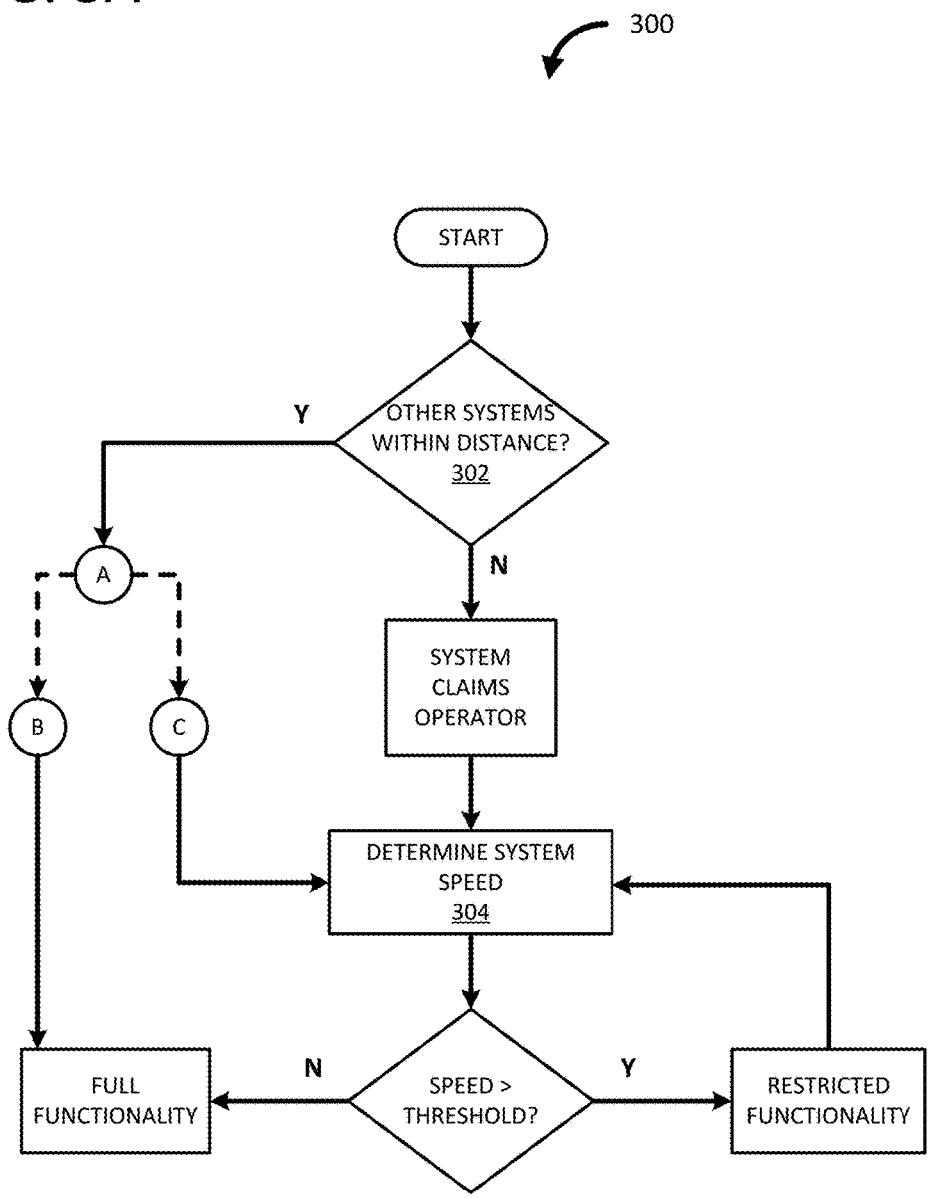

FIGS. 3A and 3B illustrate an exemplary operator claiming process, generally indicated at 300, performed by mobile computing device system 100. As described more fully herein, aspects of the operator claiming process are performed by at least one processor of system 100 executing processor-executable instructions that comprise a standalone application, an operating system, or combinations thereof. At step 302, system 100 determines whether any other systems (e.g., systems 100-B, 100-N, etc.) are within a predetermined distance. Exemplary distances include those indicative of a plurality of systems 100 being located within the same vehicle (e.g., about five meters), but one of ordinary skill in the art will understand that other distances are within the scope of the present disclosure. When system 100 determines at step 302 that no other systems are within the predetermined distance, system 100 claims the operator token and proceeds to determine its speed at step 304. In an embodiment, it is assumed that system 100 is located inside the vehicle and will move (e.g., relative to points outside the vehicle) with the speed of the vehicle. When the speed of system 100 is greater than or equal to a predetermined threshold value (e.g., about 5 miles per hour, etc.), processor-executable instructions that comprise at least one of an operating system, a software development kit (SDK), and an application executed by processor(s) 102 of the system 100 restrict one or more functions of system 100. In an embodiment, processor-executable instructions that comprise an SDK and/or an application utilize one or more application programming interfaces (APIs) to communicate (e.g., by triggering a routine, setting a variable, making a call, etc.) to an operating system and/or another executing application that the speed of system 100 is greater than or equal to the predetermined threshold value. When the speed of system 100 is less than the predetermined threshold value, instructions that comprise at least one of an operating system, a software development kit (SDK), and an application executed by processor(s) 102 of the system 100 permit full functionality of system 100. In an embodiment, processor-executable instructions that comprise an SDK and/or an application utilize one or more APIs to communicate (e.g., by triggering a routine, setting a variable, making a call, etc.) to an operating system and/or another executing application that the speed of system 100 is less than the predetermined threshold value. In an embodiment, system 100 determines its speed via one or more of triangulation (e.g., via Wi-Fi transceiver 116 and/or cellular transceiver 118), geolocation (e.g., via GPS receiver 120), and the like.

Figure 5:
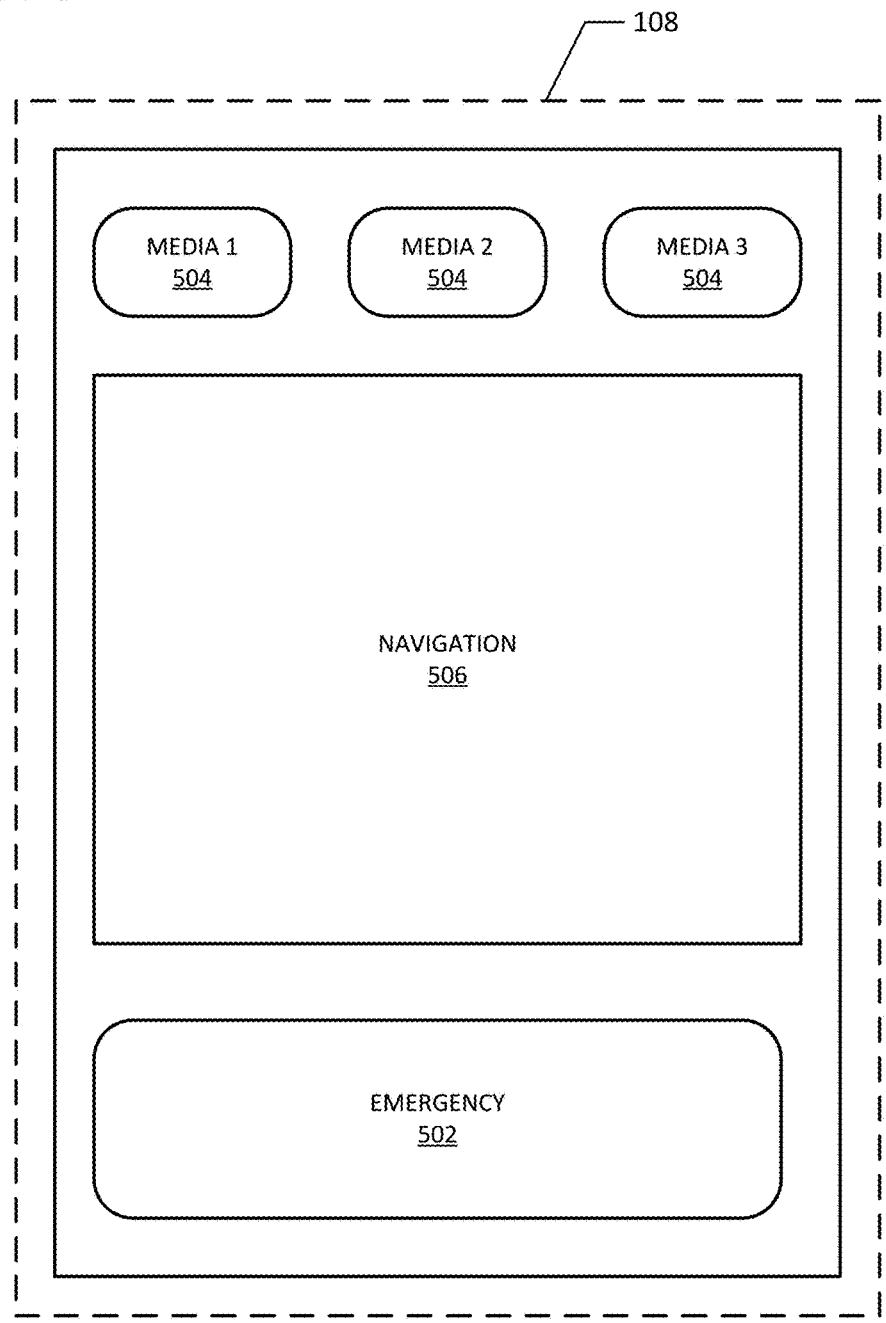

Exemplary function restrictions include altering the opacity of an overlay screen on electronic visual display 108. In an embodiment, the overlay screen is a gray screen, as described more fully hereinafter. In another embodiment, the overlay screen is any image desired by the user. Frame (a) of FIG. 4 illustrates an exemplary embodiment in which the overlay screen has an opacity of zero percent when the speed of system 100 is less than the predetermined threshold value. Frame (c) of FIG. 4 illustrates an exemplary embodiment in which the overlay screen has an opacity of one hundred percent when the speed of system 100 is greater than or equal to the predetermined threshold value. In an embodiment, the overlay screen has an opacity of one hundred percent (e.g., Frame (c) of FIG. 4), but includes an emergency call button with an opacity of zero percent. In an optional embodiment, the functionality restriction increases corresponding with an increase of the speed of system 100. Frame (b) of FIG. 4 illustrates an exemplary embodiment in which the overlay screen has an opacity of about fifty percent when the speed of system 100 is between about 5 miles per hour and 10 miles per hour, for example, before changing to an opacity of one hundred percent (e.g., frame (c)) over 10 miles per hour, for example. Other exemplary function restrictions within the scope of the disclosure include, but are not limited to, disabling and/or restriction functions of messaging applications (e.g., text message, instant message, email, etc.), social media applications, music applications, and the like. In an embodiment, when the speed of system 100 is greater than or equal to the predetermined threshold value, system 100 displays a restricted functionality graphical user interface (GUI) that includes an emergency call (e.g., 911, designated emergency contact, etc.) button 502, a limited (e.g., three) number of media preset buttons 504, and a navigation display 506, as illustrated in FIG. 5.

Referring again to FIG. 3A, when system 100 determines at step 302 that other systems are within the predetermined distance, the process continues to step 306. Referring to FIG. 3B, system 100 determines at step 306 whether it has received a designated operator token from operator beacon 204. When system 100 receives the designated operator token from operator beacon 204 it disclaims the vehicle operator role and instructions that comprise at least one of an operating system, a software development kit (SDK), and an application executed by processor(s) 102 of the system 100 permit full functionality of system 100. In an embodiment, processor-executable instructions that comprise an SDK and/or an application utilize one or more APIs to communicate (e.g., by triggering a routine, setting a variable, making a call, etc.) to an operating system and/or another executing application that system 100 has received the designated operator token from operator beacon 204 and disclaims the vehicle operator role. When system 100 does not receive a token from operator beacon 204, it knows it is one of a plurality of systems that may belong to a vehicle operator and forces the systems to coordinate designation of the system that belongs to the operator. The system 100 is added, at 308, to a group of systems that includes all systems within the predetermined distance.

At step 310, system 100 determines whether the user has affirmatively claimed the operator token (e.g., via selection of a button on a GUI of electronic visual display 108, via a default profile, etc.). For example, the user may affirmatively claim the operator token by selecting a button on a GUI of electronic visual display 108 before beginning to operate a vehicle and/or heavy machinery. When system 100 determines that the user has affirmatively claimed the operator token, the process continues to step 312 and system 100 determines whether any other systems within the group also claim the operator token. When no other systems claim the operator token, system 100 proceeds to determine its speed at step 304. When at least one other system also claims the operator token (e.g., a user of the at least one other system affirmatively claimed the operator token substantially simultaneously with the user of system 100 affirmatively claiming the operator token, etc.), system 100 and the other systems claiming the operator token display, at step 314, an opt-out screen to receive opt-out selections via a GUI of electronic visual display 108 before proceeding back to step 310. Displaying the opt-out screen on the systems enables the system users to coordinate amongst themselves which user's system should claim the operator token. In an embodiment, users who do not desire to claim the operator token enter opt-out selections on their respective systems.

When system 100 determines at step 310 that the user has not affirmatively claimed the operator token, system 100 verifies at step 316 that at least one other system within the group has claimed the operator token. When at least one other system has claimed the operator token, system 100 disclaims the operator token and instructions that comprise at least one of an operating system, a software development kit (SDK), and an application executed by processor(s) 102 of the system 100 permit full functionality of system 100. In an embodiment, processor-executable instructions that comprise an SDK and/or an application utilize one or more APIs to communicate (e.g., by triggering a routine, setting a variable, making a call, etc.) to an operating system and/or another executing application that system 100 has disclaimed the operator token. When system 100 determines at step 316 that no other systems have claimed the operator token, system 100 and the other systems in the group display, at step 318, an operator claiming screen to receive operator claiming selections via a GUI of electronic visual display 108. In an embodiment, displaying the operator claiming screen to all systems in the group enables the users of the group systems to select at least one system as belonging to a vehicle operator. As explained below, in an embodiment, if the users of the group systems do not select at least one system as belonging to a vehicle operator then all systems in the group will have one or more functions thereof restricted.

The system 100 determines, at step 320, whether the elapsed time since creation of the group is less than a predetermined threshold value (e.g., about one minute, etc.). When the elapsed time is less than the predetermined threshold value, the process continues back to step 310. When the elapsed time is greater than or equal to the predetermined threshold value, system 100 claims the operator token and processor-executable instructions that comprise at least one of an operating system, a software development kit (SDK), and an application executed by processor(s) 102 of the system 100 restrict one or more functions of system 100. In an embodiment, processor-executable instructions that comprise an SDK and/or an application utilize one or more APIs to communicate (e.g., by triggering a routine, setting a variable, making a call, etc.) to an operating system and/or another executing application that system 100 has claimed the operator token. In an embodiment, the timing component encourages the system users to designate a vehicle operator within the predetermined time or the users of all systems will be designated as vehicle operators and all systems will have one or more functions thereof restricted.

Figure 6:
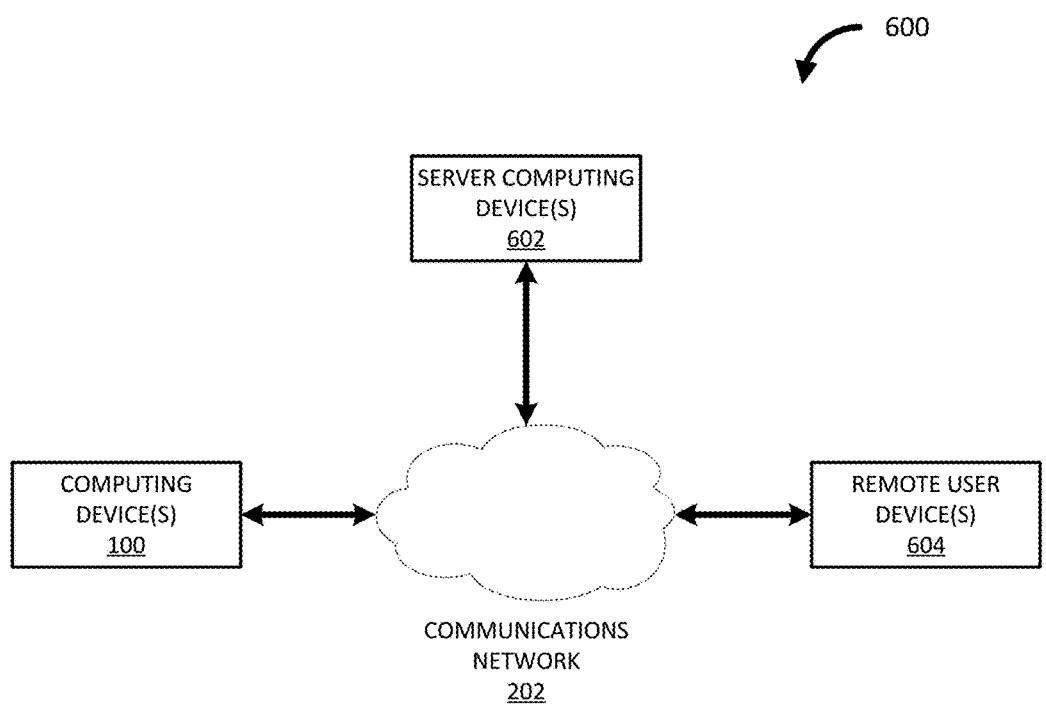
FIG. 6 is a block diagram of a computing device restriction system according to an embodiment.

FIG. 6 illustrates an exemplary computing device restriction system, generally indicated at 600, in accordance with an aspect of the invention. The computing device restriction system 600 includes one or more mobile computing device systems 100, one or more server computing devices 602, and one or more remote user devices 604 communicatively coupled via communications network 202. The server computing devices 602 are configured to implement components that implement aspects of the operator claiming process and/or track compliance of the mobile computing device systems 100 in executing the processor-executable instructions that comprise at least one of the operating system, the SDK, and the application that determine whether an operator of mobile computing device system 100 is designated as an operator of a vehicle and/or heavy machinery and restrict one or more functions of mobile computing device system 100 when the operator is so designated. In an embodiment, server computing devices 602 comprise a back-end of computing device restriction system 600. Aspects of server computing devices 602 are further described herein.

The remote user devices 604 are configured to access data stored on server computing devices 602 via communications network 202. Exemplary computing devices include, but are not limited to, personal computers (PCs), desktop computers, laptop computers, tablet computing devices, smartphones, one or more server computers, and the like, and/or combinations thereof. In an embodiment, remote user devices 604 comprise at least an insurance computing system, a parent/guardian computing system, a public safety organization computing system, and the like, and/or combinations thereof.

Figure 7:
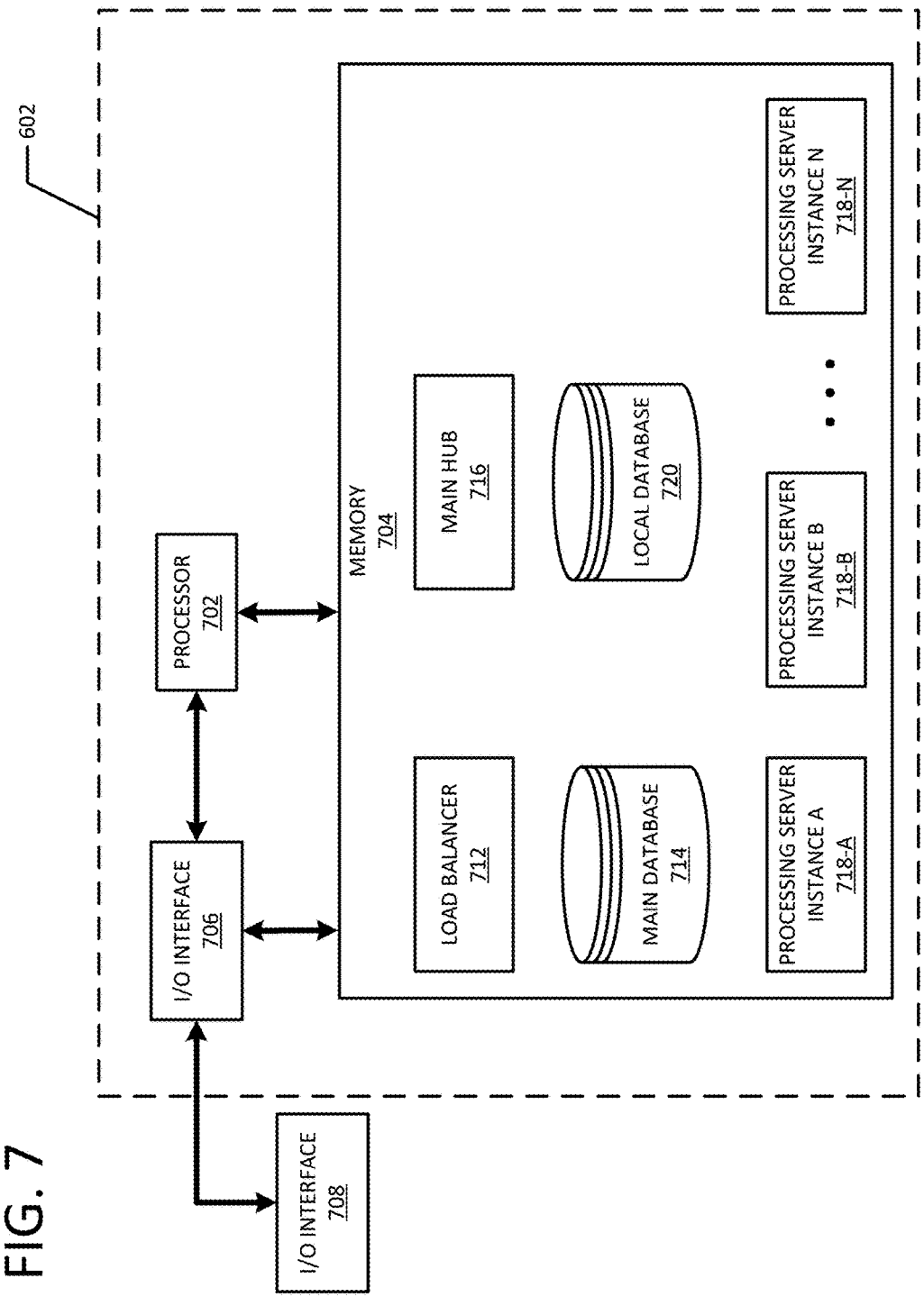
FIG. 7 is a block diagram of a server computing device of the restriction system of FIG. 6.

FIG. 7 illustrates an exemplary architecture of at least one of the server computing devices 602 programmed to provide aspects of the systems and processes described herein via a software environment. In the embodiment of FIG. 7, the server computing device 602 includes a processor 702, a memory 704, and an input/output (I/O) interface 706. The memory 704 includes (e.g., stores processor-executable instructions and/or data structures comprising) a load balancer 712, a main database 714, a main hub 716, one or more processing server instances 718-A, 718-B, 718-N, and a local database 720 embodied in processor-executable instructions for executing by processor 702. In this manner, server computing device 602 comprises a special-purpose computing device for implementing aspects of the operator claiming process and/or tracking compliance of the mobile computing device systems 100 in executing the processor-executable instructions that comprise at least one of the operating system, the SDK, and the application that determine whether an operator of mobile computing device system 100 is designated as an operator of a vehicle and/or heavy machinery and restrict one or more functions of mobile computing device system 100 when the operator is so designated in accordance with an aspect of the disclosure.

The processor 702, memory 704, and I/O interface 706 are communicatively connected and/or electrically connected to each other. The I/O interface 706 is communicatively and/or electrically connected to the I/O component 708. The processor 702 is adapted to execute processor-executable instructions stored in memory 704 for implementing the load balancer 712, the main database 714, the main hub 716, the processing server instances 718, and/or the local database 720. The I/O interface 706 of FIG. 7 provides a physical data connection between server computing device 602 and I/O component 708. In an embodiment, I/O interface 706 is a network interface card (NIC), modem, or the like and I/O component 708 is a telecommunications network (e.g., communications network 202), as further described herein.

The load balancer 712 is configured to receive queries (e.g., requests, etc.) from mobile computing device systems 100 and redirect (e.g., process) the queries to backend servers and/or services (e.g., main database 714, main hub 716, processing server instances 718, local database 720, etc.). In an embodiment, load balancer 712 processes all non-heavy queries from mobile computing device systems 100. For example, heavy queries include those related to user grouping and load balancer 712 will not process such queries. An exemplary load balancer 712 includes the Elastic Load Balancing (ELB) service available via Amazon Web Services (AWS).

The main database 714 is configured to store (e.g., in computer-readable storage media) permanent user details, a list of regions (e.g., geographic regions), and a list of processing server instances 718. In an embodiment, main database 714 does not store any data related to user grouping. An exemplary main database 714 includes a hosted relational database, such as Amazon Aurora, with few read replicas. In an embodiment, main database 714 stores at least a "Users" table, a "Regions" table, and a "ProcessingServers" table. In an embodiment, the "Users" table includes the following columns: id (unique AI identifier), first_name (string), last_name (string), last_active (date), current_region_id (integer, linked to Regions table), target_server_id (integer, linked to ProcessingServers table), last_data (string, JSON data). In an embodiment, the "Regions" table includes the following columns: id (unique AI identifier), name (string, unique), last_activity (date, time), target_server_id (integer, liked to ProcessingServers table). In an embodiment, the "ProcessingServers" table includes the following columns: id (unique AI identifier), instance_id (string, instance id), instance_url (string, instance's public URL web address), instance_status (enum, instance health with values "shutting-down", "idle", "healthy", "low-load", "high-load"), instance_status_history (string, an array of last 10 health statuses).

The main hub 716 is configured to process the list of regions stored on main database 714, launch and stop processing server instances 718, and assign the regions (e.g., geographic regions) stored on main database 714 to processing server instances 718. In an embodiment, main hub 716 is referred to as a strong single instance. In an embodiment, main hub 716 is not publicly accessible. In another embodiment, main hub 716 does not process any user data or grouping data.

The processing server instances 718 are configured to receive user coordinates (e.g., of a geographic coordinate system, a Global Positioning System, etc.) from mobile computing device systems 100, to return a current group status of the user to mobile computing device systems 100, and to execute a cron utility (e.g., "cron job") to process user groupings (e.g., groupings of mobile computing device systems 100). In an embodiment, each server instance 718 comprises a separate database and/or server computing device. Each processing server instance 718 includes a list of regions (e.g., geographic regions) that it is allowed to process queries from and a list of users (e.g., of mobile computing device systems 100) assigned to it. In an embodiment, the list of regions is defined by a "Regions" table on local database 720 and/or the list of users is defined by a "Users" table on local database 720, as further described herein. Each processing server instance 718 includes an application programming interface (API) allowing an application (e.g., processor-executable instructions) executing on the mobile computing device systems 100 to send coordinates (e.g., as determined by GPS receiver 120, etc.) of the systems 100, receive a user group status (e.g., as determined by operator claiming process 300, etc.), allowing main hub 716 to configure the list of regions allowed to process on the instance 718, to export current data from local database 720, to import new data into local database 720, and to mark the instance 718 as "shutting down."

The local database 720 is configured to provide data storage for each processing server instance 718. In an embodiment, the local database 720 is a temporary data storage having a high capacity. An exemplary local database 720 includes a local MySQL database installed on a processing server instance 718. In an embodiment, local database 720 stores at least a "Users" table, a "Regions" table, and a "Groups" table. In an embodiment, the "Users" table includes the following columns: id (unique identifier), first_name (string), last_name (string), current_region_id (integer, linked to Regions table), latitude "lat" (float), longitude "lng" (float), coordinates_history (string, contains last 10 lat/lng pairs), group_id (integer, linked to Groups table), is_driver (enum, driver status with values " ", "yes", "no"), last_updated (date, time), last_verified_region (date, time). In an embodiment, the "Regions" table includes the following columns: id (unique identifier), name (string, unique), last_updated (date, time). In an embodiment, the "Groups" table includes the following columns: id (unique AI identifier), last_updated (date, time).

Figure 8:
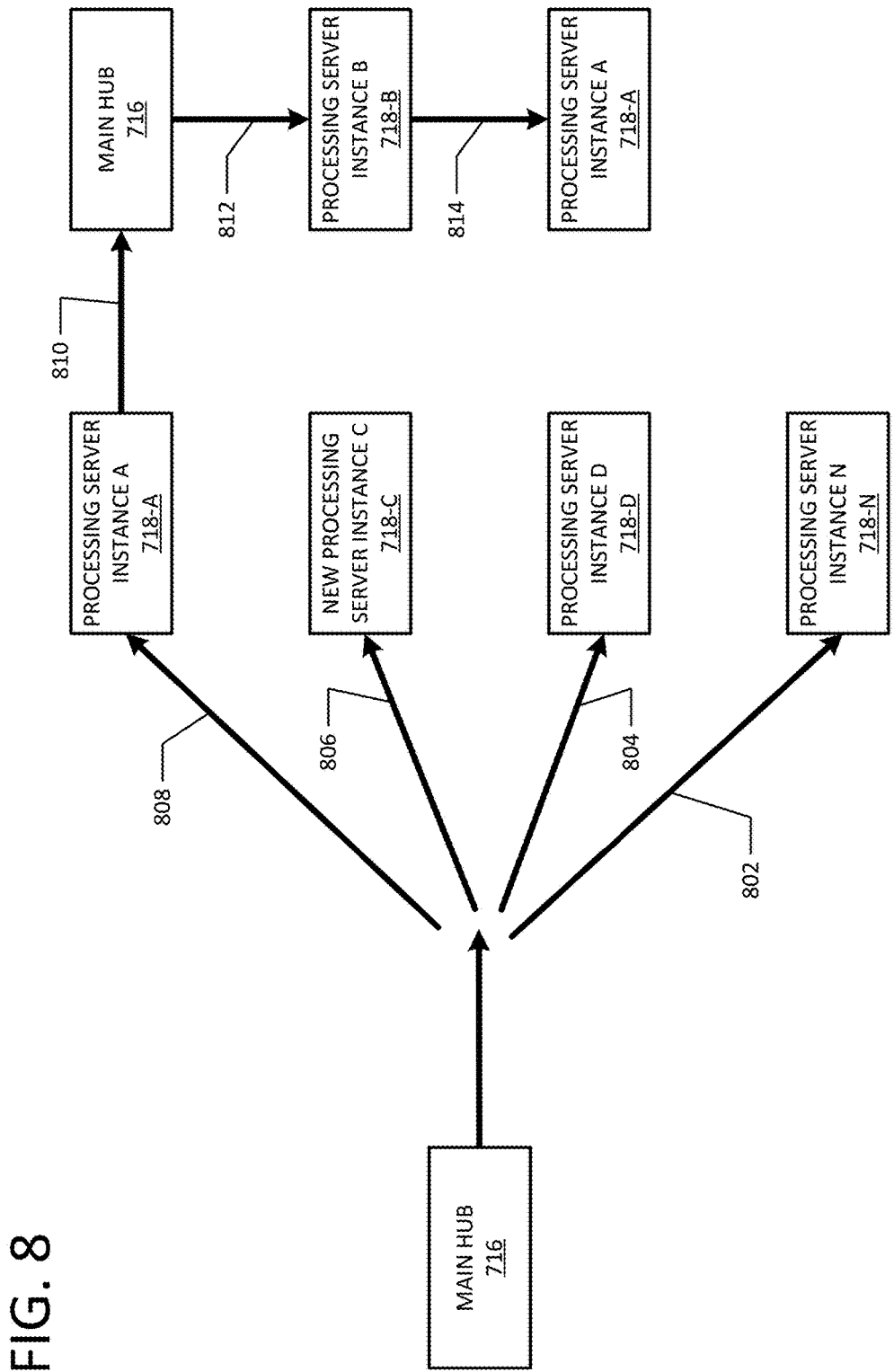
FIG. 8 illustrates exemplary processes of a cron utility executing on a main hub according to an embodiment.

FIG. 8 illustrates exemplary processes of a cron utility executing on main hub 716, in accordance with an aspect of the disclosure. In one embodiment, the cron utility executing on main hub 716 removes, at 802, a region from a processing server instance 718-N. The executing cron utility advances through a list of regions (e.g., geographic regions in a "Regions" table, etc.) and detects any regions that were not updated during a predetermined period of time (e.g., for the last 6 hours, etc.) but have a processing server instance 718 associated with them. In an embodiment, detecting whether a region was updated during the predetermined period of time comprises the executing cron utility comparing a current date and/or time (e.g., as provided by a clock, counter, etc.) to a date and/or time stored in the "last_activity" column of the "Regions" table for the row of the region. In another embodiment, determining that a region has a processing server instance 718 associated with it comprises the executing cron utility determining that the "target_server_id" column is not empty (e.g., NULL) for the row of the region. The executing cron utility selects the processing server instance 718 from the "ProcessingServers" table that corresponds to the region(s) (e.g., using the value in the "target_server_id" column) and, at 802, sends a query to the corresponding instance 718-N (e.g., using the address stored in "instance_url") to remove the region from the instance 718-N. Sending this query removes the region from the instance 718-N by deleting the row corresponding to the region from the "Regions" table of the local database 720 associated with instance 718-N. In response, the instance 718-N clears the corresponding "current_region_id" and "target_server_id" fields from main database 714. In an embodiment, the query comprises a POST method. An exemplary POST method includes:

POST ProcessingServer/remove-region
Request Body: {"Secret": "123456XYZ", "RegionName": "Texas"}
Response Body: {"Status": "ok"}

In another embodiment, the cron utility executing on main hub 716 shuts down, at 804, a processing server instance 718-D. The executing cron utility advances through a list of processing server instances 718 (e.g., in a "ProcessingServers" table, etc.) and detects any instances 718 having the status (e.g., "instance_status" field) set to "shutting-down." When an instance 718-D is marked to shutting down during a previous predetermined number of cycles (e.g., last 10 cycles, etc.) based on the value in the "instance_status_history" field, then this instance 718-D will be shut down, at 804, and its corresponding row will be deleted from the "ProcessingServers" table in main database 714.

In yet another embodiment, the cron utility executing on main hub 716 launches, at 806, a new processing server instance 718-C and/or starts, at 808, a migration of processing server instance 718-A. The executing cron utility advances through a list of processing server instances 718 (e.g., in a "ProcessingServers" table, etc.), except those instances 718 with status "shutting-down," and reads the processing (e.g., CPU) usage and/or memory usage of each instance 718. Based on the processing and/or memory usage, the executing cron utility determines a health status of each instance 718 as "idle" (e.g., less than 20% usage, etc.), "healthy" (e.g., 20-70% usage, etc.), "low-load" (e.g., 70-90% usage, etc.), or "high-load" (e.g., greater than 90% usage, etc.). The executing cron utility writes this health status data of each instance 718 into the corresponding row of the main database 714 (e.g., "instance_status" field and "instance_status_history" field, etc.). Based on the health statuses of the instances 718, the executing cron utility will launch the new processing server instance 718-C and/or start the migration of processing server instance 718-A, as explained below.

When none of the instances 718 have a health status of "idle" or "healthy" (e.g., all instances 718 are at 70% or greater usage, etc.), the executing cron utility launches, at 806, a new processing server instance 718-C and pushes a new record into the "ProcessingServers" table for this launched instance 718-C. In an embodiment, the newly launched instance 718-C initially has a health status of "idle" and is available for use in subsequent cycles and/or queries.

When an instance (e.g., instance 718-A) has a health status of "idle" during a previous predetermined number of cycles (e.g., last 10 cycles, etc.) based on the value in the "instance_status_history" field and there's at least one other instance 718 (e.g., instance 718-B) having a health status of "idle" or "healthy" then the executing cron utility schedules the instance 718-A to shut down within a predetermined period of time (e.g., 10 minutes, etc.). All regions and users associated with the instance 718-A are migrated to the at least one other instance 718-B having a health status of "idle" or "healthy." At 808, main hub 716 sends a query to instance 718-A via an API to export all data from the local database 720 associated with instance 718-A. In an embodiment, the query comprises a POST method. An exemplary POST method includes:

POST ProcessingServer/export-data
Request Body: {"Secret": "123456XYZ"}
Response Body: Raw SQL The instance 718-A makes a snapshot of the current SQL, saves it locally (e.g., local database 720) and returns, at 810, the SQL to main hub 716. The main hub 716 sends, at 812, a query to instance 718-B via an API to import the data exported from instance 718-A. In an embodiment, the query comprises a POST method. An exemplary POST method includes:

POST ProcessingServer/import-data

Request Body: {"Secret": "123456XYZ", "SQL": "http://main-hub.drivingapp/exported-sql-1234.sql"}

Response Body: {"Status": "ok"}

The instance 718-B downloads the SQL from main hub 716 and imports it into the associated local database 720. Upon response, main hub 716 deletes the SQL. The main hub 716 updates all rows of the "Users" and "Regions" tables in the main database 714 linked to instance 718-A (e.g., based on the "target_server_id" field) and assigns them to instance 718-B. The status (e.g., "instance_status" field) of instance 718-A is set, at 814, to "shutting-down." Moreover, a query is sent to the API of instance 718-A. In an embodiment, the query comprises a POST method. An exemplary POST method includes:

POST ProcessingServer/start-migration

Request Body: {"Secret": "123456XYZ", "TargetUrl": "http://processing-server-1234.drivingapp.com" }

Response Body: {"Status": "ok"}

This query makes instance 718-A stop any further processing of cron utilities and stop writing data from mobile computing device systems 100 into the associated local database 720. All queries from applications executing on mobile computing device systems 100 received by instance 718-A will receive a response that instructs the applications executing on systems 100 should stop sending queries to instance 718-A and instead send all subsequent queries to instance 718-B (e.g., using a "TargetUrl" value). An exemplary response body includes:

Response Body: {"Status": "migrating", "TargetUrl": "http://processing-server-1234.drivingapp.com" }

In addition to the cron utilities described above, main hub 716 includes an API end-point for requesting to assign a region to an instance 718. In an embodiment, the request comprises a POST method. An exemplary POST method includes:

POST MainHub/assign-server

Request Body: {"Secret": "123456XYZ", "RegionId": "Texas" }

Response Body: {"Status": "ok", "TargetInstanceId": 1234}

This end-point checks for instances 718 having a status of "idle" or "healthy." If no such instances are found, it will launch one (e.g., instance 718-C at 806, etc.). The region is assigned to the instance 718 using the API of the instance and the following end-point:

POST ProcessingServerer/assign-region

Request Body: {"Secret": "123456XYZ", "RegionId": 1234, "RegionName": "Texas"}

Response Body: {"Status": "ok"}

The processing server instance 718 adds a new item into the "Regions" table of the associated local database 720. Upon result, main hub 716 updates the corresponding fields (e.g., "target_server_id" field) on main database 714 and return the instance ID.

Figure 9:
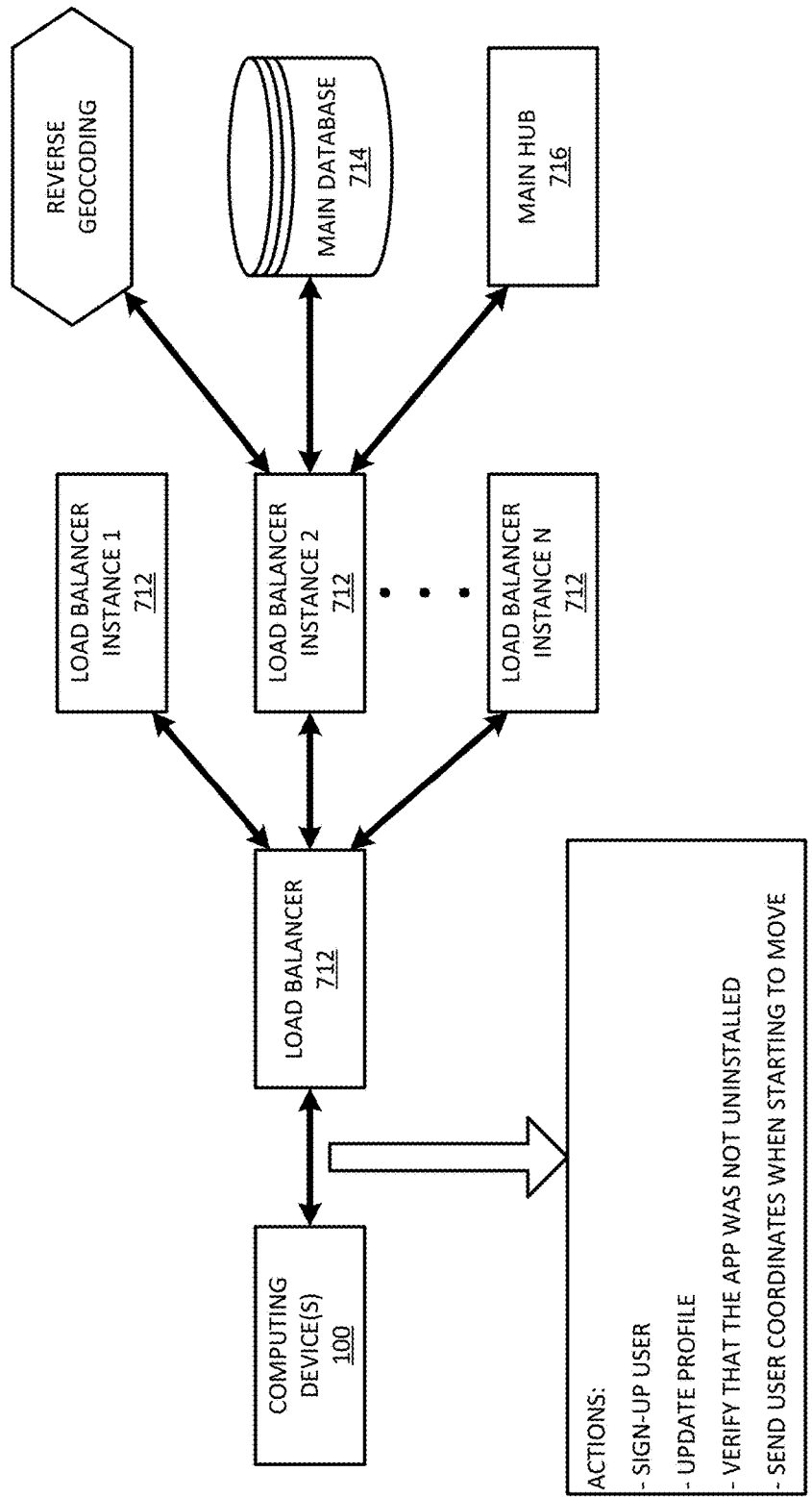
FIG. 9 illustrates an exemplary query process according to an embodiment.

FIG. 9 illustrates an exemplary process of an application executing on a mobile computing device system 100 sending one or more initial queries to load balancer 712, which utilizes main database 714 to process the queries, in accordance with an aspect of the disclosure. As described herein, exemplary queries (e.g., actions) include, but are not limited to, signing-up a user (e.g., a mobile computing device system 100), updating a user profile, verifying that the application (e.g., the processor-executable instructions that comprise at least one of the operating system, the SDK, and the application that determine whether an operator of mobile computing device system 100 is designated as an operator of a vehicle and/or heavy machinery and restrict one or more functions of mobile computing device system 100 when the operator is so designated) was not removed (e.g., uninstalled) from the user's system 100, and sending the coordinates of system 100 when it begins to move. In an embodiment, the applications executing on systems 100 utilize a global secret key while querying server computing devices 602 (e.g., the "back-end") for security purposes.

In an embodiment, users complete a sign-up process via a GUI displayed on electronic visual display 108 of systems 100. Once completed, the executing application on system 100 submits the sign-up data to load balancer 712, which creates a new record in the "Users" table in main database 714. In response, the application executing on system 100 stores (e.g. in memory device 104, etc.) the response session token to be used in all subsequent queries sent by this system 100. In an embodiment, the sign-up data submission comprises a POST method. An exemplary and non-limiting POST method includes:

POST ELB/sign-up

Request Body: {"Secret": "123456XYZ", "FirstName": "John", "LastName": "Doe"}

Response Body: {"Status": "ok", "Session": "1234567890abcdef"}

In another embodiment, a user updates (e.g., changes) his or her profile. In response, the application executing on system 100 submits the updated data to load balancer 712, which updates the corresponding record in the "Users" table in main database 714. In an embodiment, the updated data submission comprises a POST method. An exemplary and non-limiting POST method includes:

POST ELB/update-profile

Request Body: {"Secret": "123456XYZ", "Session": "1234567890abcdef", FirstName": "John", "LastName": "Doe"}

Response Body: {"Status": "ok"}

In yet another embodiment, the application executing on each system 100 provides verification to server computing devices 602 that the application was not removed (e.g., uninstalled) from the system 100. The application executing on each system 100 sends this verification at least once during a predetermined time period (e.g., once every 24 hours, etc.). In response to receiving the verification, load balancer 712 updates the corresponding user entry in the "Users" table of main database 714. In an embodiment, this update comprises setting the "last_active" field for the user equal to the current date and/or time. In another embodiment, a user is deemed "inactive" when server computing device 602 does not receive verification for a predetermined period of time (e.g., 7 days, etc.). In an embodiment, the verification data submission comprises a POST method. An exemplary and non-limiting POST method includes:

POST ELB/ping

Request Body: {"Secret": "123456XYZ", "Session": "1234567890abcdef"}

Response Body: {"Status": "ok"}

In another embodiment, the application executing on each system 100 sends the coordinates of system 100 to server computing devices 602 when it begins to move. This coordinate data submission comprises, at least in part, step 304 in accordance with an aspect of the present disclosure. In an embodiment, the coordinate data submission comprises a POST method. An exemplary and non-limiting POST method includes:

POST ELB/start-movement
Request Body: {"Secret": "123456XYZ", "Session": "1234567890abcdef", "Lat":12.345678, "Lng": 12.345678}
Response Body: {"Status": "ok", "Server": "http://processing-server-1234.drivingapp.com/"}

Upon receiving the coordinate data submission, load balancer 712 utilizes a reverse geocoding service to identify a current region within which the system 100 is located. In an embodiment, the reverse geocoding service identifies the current region of system 100 to the county level (e.g., Country, State, and County). However, one of ordinary skill in the art will understand that more detailed regions (e.g., city, town, neighborhood, building, vehicle, seat, etc.) are within the scope of the present disclosure. Upon identifying the region, load balancer 712 checks the "Regions" table of main database 714 to determine whether an entry for the identified region exists and creates such an entry if it does not exist. The load balancer 712 sets the "last_activity" field for that region to the current date and/or time. When the "target_server_id" field for the region is empty (e.g., NULL), load balancer 712 queries main hub 716 requesting it to allocate a processing server instance 718 for the region. In response, load balancer 712 returns the URL (e.g., "instance_url" field) of the allocated instance 718 to the application executing on system 100 for use by the application in subsequent queries. The load balancer 712 also updates the corresponding "Users" row in main database 714 (e.g., "current_region_id," "target_server_id," and "last_active" fields). The load balancer 712 queries the API of the corresponding processing server instance 718 to clone the user's data to the local database 720 via an end-point. An exemplary and non-limiting end-point includes:

POST ProcessingServer/assign-user
Request Body: {"Secret": "123456XYZ", "UserId":1234, "UserFirstName":"John", "UserLastName":"Doe", "RegionId":1234, "LastData":"JSON data including driver status and last 10 positions"}
Response Body: {"Status": "ok", "Server": "http://processing-server-1234.drivingapp.com/"}

All further queries from the application executing on system 100 will go to this instance 718. In an embodiment, when the system 100 stops movement for a long period of time (e.g., 10 minutes, etc.) and starts moving again then the application executing on system 100 sends another query to ELB/start-movement to identify the new instance URL. Once the instance 718 is identified, the application executing on system 100 pushes the coordinates of system 100 into the API for this instance 718 at a predetermined time interval (e.g., every 5 seconds, etc.) via an end-point. An exemplary and non-limiting end-point includes:

POST ProcessingServer/set-location
Request Body: {"Secret": "123456XYZ", "Latitude": 25.7616798, "Longitude": −80.1917902, "IsDriver": " "}
Response Body: {"Status": "ok", "Group": {"id": 123456, "members": [{"id": 1234567890, "FirstName": "John", "LastName": "Doe", "IsDriver": " " }, {"id": 1234567890, "FirstName": "Alice", "LastName": "Doe", "IsDriver": "No"}, {"id": 1234567890, "FirstName": "Bob", "LastName": "Doe", "IsDriver": "Yes"}] }}

Figure 10:
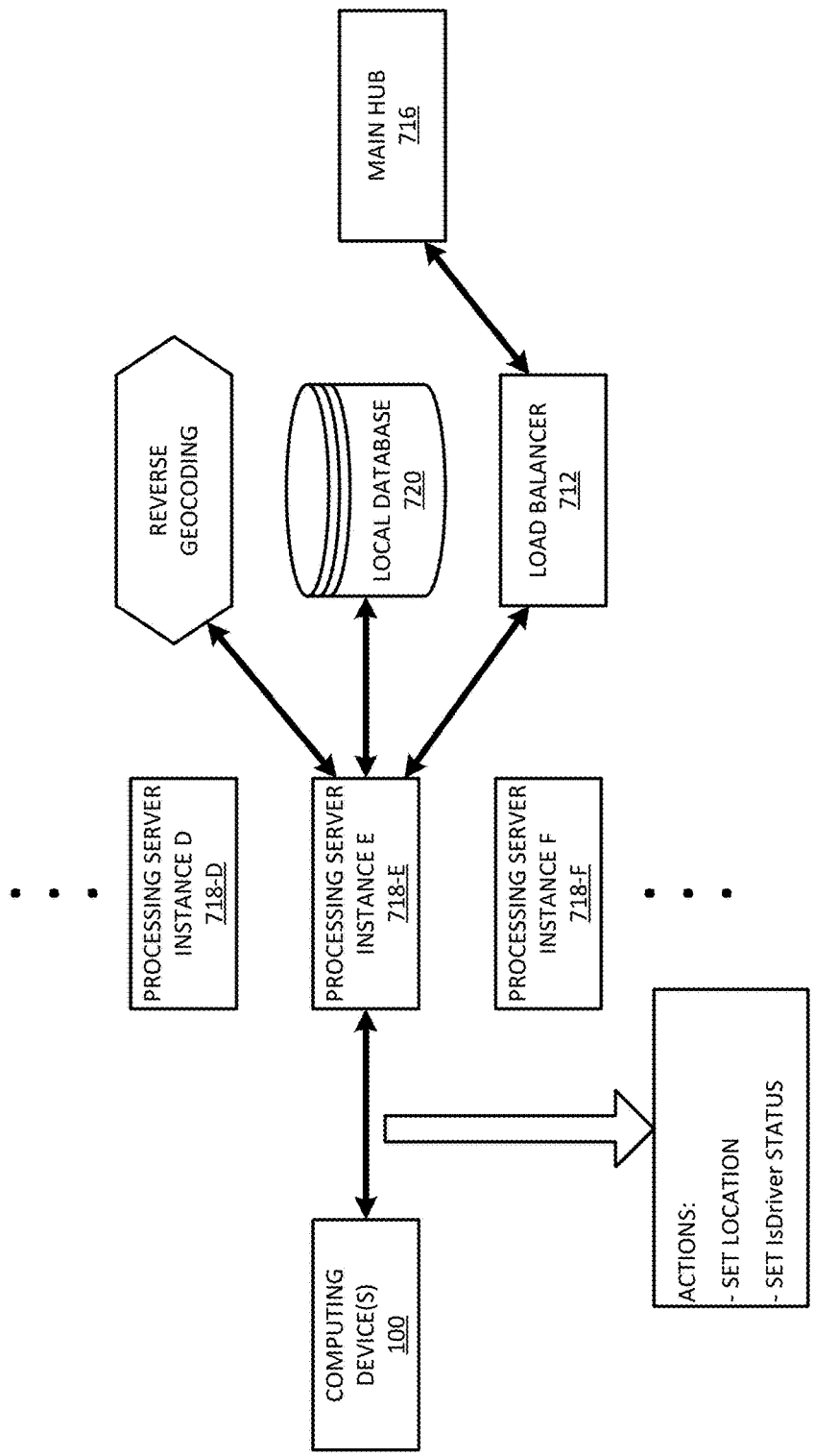
FIG. 10 illustrates an exemplary location setting process according to an embodiment.

FIG. 10 illustrates an exemplary process of an application executing on a mobile computing device system 100 setting its location by sending the coordinates of the system 100 into an API of a processing server instance 718, in accordance with an aspect of the disclosure. In an embodiment, in response to receiving the coordinates of system 100, an instance 718-E updates the coordinate-related fields (e.g., "lat," "lng," "coordinates_history," "is_driver," "last_updated") at the corresponding row in the "Users" table of local database 720. In an embodiment in which the region of system 100 has not been verified within a predetermined time period (e.g., last 30 minutes, etc.) based on the "last_verified_region" field then the instance 718-E uses the reverse geocoding service to verify the region of system 100.

In an embodiment, the region of system 100 has changed and the new region is also being processed by this instance 718-E. In this embodiment, instance 718-E updates the "region_id" field and sends a query to an end-point of load balancer 712 to update at main database 714. The end-point updates main database 714 and changes the "current_region_id" field in the "Users" table. An exemplary and non-limiting end-point includes:

POST ELB/update-user-region
Request Body: {"Secret": "123456XYZ", "UserId", "1234", "RegionName": "Texas"}
Response Body: {"Status": "ok"}

In another embodiment, the region of system 100 has changed and the new region is not being processed by this instance 718-E. In this embodiment, instance 718-E requests migration of the user from load balancer 712 via an end-point. An exemplary and non-limiting end-point includes:

POST ELB/migrate-user
Request Body: {"Secret": "123456XYZ", "UserId", "1234", "RegionName":"Texas", "LastData": "JSON data containing driver status and last 10 positions"}
Response Body: {"Status": "ok", "Server": "http://processing-server-1234.drivingapp.com/"}

The load balancer 712 assigns the user to a new server processing instance 718 using the ProcessingServer/assign-user end-point and returns an instance URL. This deletes the user's row from the "Users" table in local database 720 and the processing server instance 718 returns the new server URL to the application executing on system 100 for migration. And exemplary and non-limiting response includes:

Response Body: {"Status": "migrating", "TargetUrl": "http://processing-server-1234.drivingapp.com"}

During this migration the user will keep the driving status and a predetermined number (e.g., 10) of last positions, but will lose the group association. If the systems 100 of all other group members also migrate (e.g., the vehicle in which they all are located moves from one county to another, etc.) then a new group is formed on a new processing server instance 718 and all systems 100 will keep their driving statuses. In an embodiment, when a region of a system 100 was not changed it will update the "last_updated" field of the corresponding region from local database 720 to mark this region as active. In another embodiment, when a user (e.g., the user's system 100) is assigned to a group it will retrieve all other user details associated to the group. The "last_updated" field of the group is updated to mark it as active. In another embodiment, the processing server instance 718 returns the user's current group participation information as a response body as further described herein.

Figure 11:
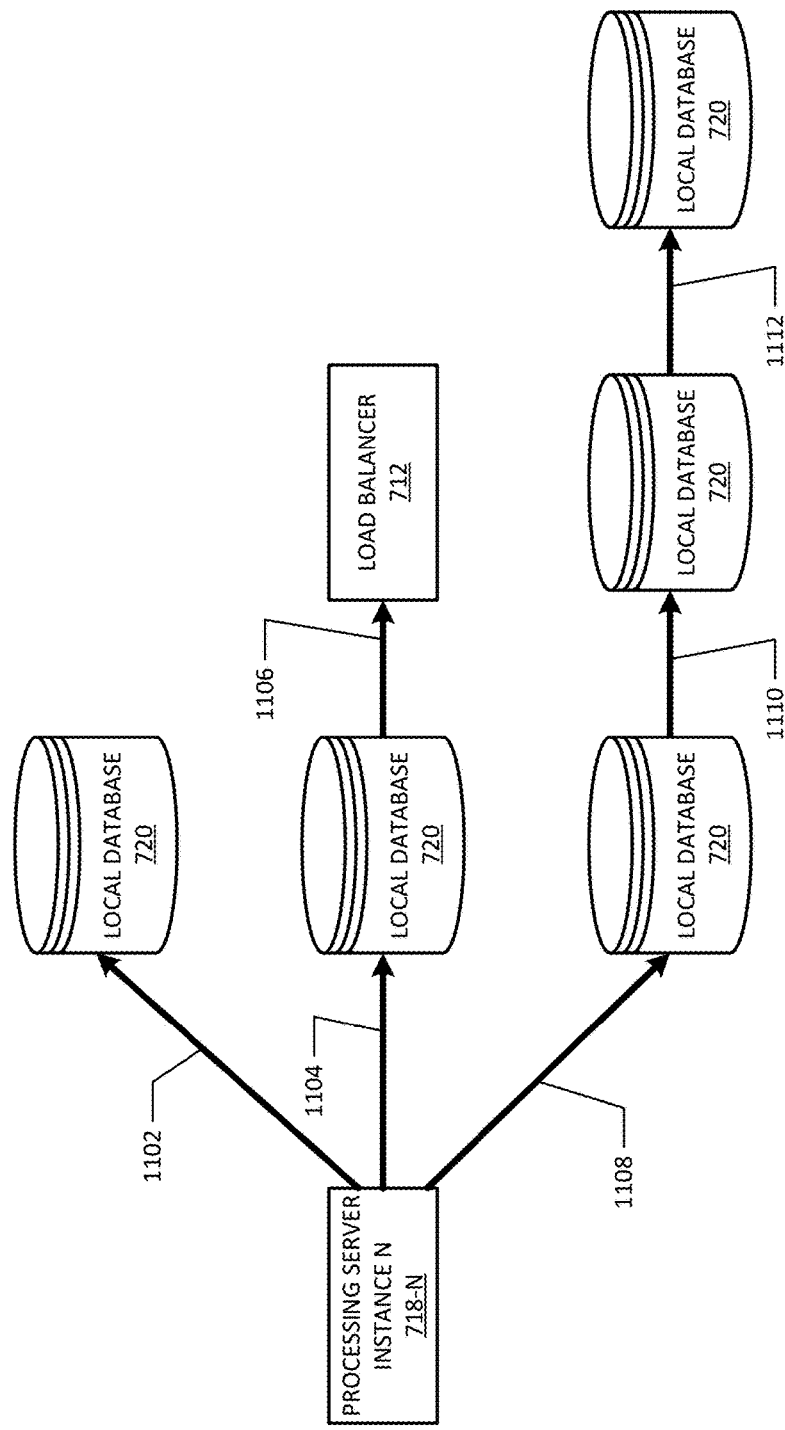
FIG. 11 illustrates exemplary processes of a cron utility executing on a processing server instance according to an embodiment.

FIG. 11 illustrates exemplary processes of a cron utility executing on a processing server instance 718, in accordance with an aspect of the disclosure. In one embodiment, the executing cron utility loops through all groups of users (e.g., systems 100 associated with the users) that have not been updated within a predetermined time period (e.g., last 30 minutes, etc.) based on the "last_updated" field. In this embodiment, the executing cron removes all corresponding users from the group and deletes, at 1102, the group from local database 720. In another embodiment, the executing cron loops through all regions (e.g., in the "Regions" table) that have not been updated with a predetermined time period (e.g., last 30 minutes, etc.) based on the "last_updated" field. In this embodiment, the executing cron deletes, at 1104, all corresponding users and regions from local database 720 and sends, at 1106, a query to the API of load balancer 712 to update the corresponding fields of main database 714. The load balancer 712 clears the corresponding fields (e.g., "current_region_id" and "target_server_id") from the "Regions" and "Users" tables on main database 714. In an embodiment, the update query comprises a POST method. An exemplary and non-limiting POST method includes:

POST ELB/clean
Request Body: {"Secret": "123456XYZ", "RegionIds": [1234, 5678, . . . ], "UserIds": [1234, 5678, . . . ]}
Response Body: {"Status": "ok"}

In yet another embodiment, the executing cron loops, at 1108, through all regions on local database 720 and for each region process the users and update the groups. The executing cron loops, at 1110, through all users associated with the current region and calculates distances between each of the users. In an embodiment, the number of calculations is equal to the factorial from the user's amount associated to the current region (e.g., thus important to select an accurate approximate level while reverse geocoding). For all results where the distance between two users is less than a predetermined value (e.g., less than 5 meters, etc.) the executing cron checks the history locations. There are a predetermined number (e.g., 10) of history locations stored for each user. If at least for a certain number (e.g., 5) of the history locations the distance between these users was less than the predetermined distance value (e.g., 5 meters, etc.) then the executing cron considers the users to be in the same vehicle. Otherwise, the cron does not consider the users to be in the same vehicle. When the users are in the same vehicle and belong to the same group, the executing cron takes no further action in this regard. When the users are in the same vehicle but have no groups, then the executing cron creates, at 1112, a group and assigns the users to the group (FIG. 3B). When only one user of the two users is in a group then the executing cron assigns, at 1112, the other user to the group. When the two users belong to different groups then the executing cron merges, at 1112, the two groups.

In an aspect, the techniques described herein track compliance of the mobile computing device systems 100 in executing the processor-executable instructions that comprise at least one of the operating system, the SDK, and the application that determine whether an operator of mobile computing device system 100 is designated as an operator of a vehicle and/or heavy machinery and restrict one or more functions of mobile computing device system 100 when the operator is so designated. In an exemplary embodiment, an insurance computing device (e.g., comprising remote user device 604) utilizes the compliance information to determine whether a user associated with a system 100 qualifies for a discount (e.g., rebate, reimbursement, reward, etc.). For example, when the insurance computing device determines that the system 100 included and executed the processor-executable instructions during a predetermined time period (e.g., a month, etc.) (i.e., that the system 100 was compliant during the time period) then the insurance computing device records the user's insurance account as being eligible for the discount. When the insurance computing device determines that the system 100 did not include and/or did not execute the processor-executable instructions during the predetermined time period (i.e., that the system 100 was non-compliant during the time period) then the insurance computing device records the user's insurance account as being ineligible for the discount. One of ordinary skill in the art will understand that the compliance tracking enabled by aspects of the present disclosure is not limited to insurance applications and that other applications are within the scope of the present disclosure. Exemplary and non-limiting applications include compliance tracking by a parent/guardian of a user of system 100, compliance tracking public safety organizations, and the like.

In another aspect, data collected and stored by server computing devices 602 and/or remote user devices 604 is configured to be mined for patterns, anomalous values, and the like. In exemplary embodiments, computing devices implementing machine learning algorithms and/or other data analysis techniques (e.g., image processing, pattern recognition, natural language processing, artificial intelligence, etc.) analyze data stored by server computing devices 602 and/or remote user devices 604.

In an aspect, a system (e.g., system 100) includes an electronic visual display (e.g., electronic visual display 108), a communications subsystem (e.g., wireless communications subsystem 112), a processor (e.g., processor(s) 102), and a memory device (e.g., memory device 104). The processor is communicatively coupled to the electronic visual display and the communications subsystem. The memory device stores processor-executable instructions that, when executed by the processor, configure the processor to restrict one or more functions of the system when a user of the system is designated as a vehicle operator and a speed of the system exceeds a predetermined threshold value (e.g., stored in memory device 104). In one form, the restricted functions include execution of a messaging application by the processor, execution of a social media application by the processor, execution of a music application by the processor, and a display of visual information by the electronic visual display.

In another form, the user is designated as the vehicle operator by claiming an operator token. In yet another form, the communications subsystem includes a radio frequency transceiver configured to operate according to at least one of a Bluetooth protocol (e.g., Bluetooth transceiver 114), a Wi-Fi protocol (e.g., Wi-Fi transceiver 116), a cellular protocol (e.g., cellular transceiver 118), and a GPS protocol (e.g., GPS receiver 120) for claiming the operator token and determining the speed of the system. In another form, the restriction of the display of visual information includes obfuscating the display of visual information by the electronic visual display. In yet another optional form, the obfuscation progressively increases as the speed of the system increases beyond the predetermined threshold value. In another form, the obfuscation includes overlaying a gray screen and/or a predetermined, user-defined image atop the display of visual information that has a variable translucency ranging from transparent to opaque as a function of the speed of the system. In yet another form, the obfuscation includes displaying a restricted functionality GUI (e.g., FIG. 5) that includes at least one of an emergency call button (e.g., emergency call button 502), one or more media preset buttons (e.g., media preset buttons 504), a navigation display (e.g., navigation display 506), and combinations thereof.

In another aspect, a method includes a mobile computing device (e.g., system 100) claiming an operator token when the mobile computing device is more than a predetermined distance (302) (e.g., stored in memory device 104) from one or more other mobile computing devices. The method further includes determining a speed (304) of the mobile computing device and restricting one or more functions of the mobile computing device when the device claims the operator token and has a speed, as determined by said determining, that exceeds a predetermined threshold value (e.g., stored in memory device 104, etc.). In one form, the functions include executing a messaging application by a processor (e.g., processor(s) 102) of the mobile computing device, executing a music application by the processor of the mobile computing device, and displaying visual information by an electronic visual display (e.g., electronic visual display 108) of the mobile computing device.

In yet another aspect, a method includes a mobile computing device (e.g., system 100) receiving a designated operator token from an operator beacon (e.g., operator beacon 204). A user of the mobile computing device is designated as a passenger in response to the mobile computing device receiving the designated operator token. In response to the passenger designation, the mobile computing device allows all functions of the mobile computing device.

In another aspect, a method includes creating a group (308) from a plurality of mobile computing devices that are each within a predetermined distance of each other. One or more screens are presented (314, 318) via electronic display devices (e.g., electronic visual displays 108) of the mobile computing devices. The screens are configured to claim an operator token. One or more functions of one of the mobile computing devices of the group are restricted when the device claims the operator token within a predetermined time threshold (e.g., stored in memory device 104) of the group creation and the device has a speed that exceeds a predetermined speed threshold value (e.g., stored in memory device 104). The method includes restricting one or more functions of each of the devices of the group when the operator token is unclaimed after expiration of the predetermined time threshold. In one form, the functions include executing a messaging application by a processor (e.g., processor(s) 102) of the mobile computing devices, executing a music application by the processor of the mobile computing devices, and displaying visual information by an electronic visual display (e.g., electronic visual display 108) of the mobile computing devices.

In another aspect, a computer readable storage device (e.g., memory device 104) has processor readable instructions stored thereon including instructions that, when executed by a processor (e.g., processor(s) 102), implement a method of restricting computing device functions. The method includes claiming an operator token when the mobile computing device is more than a predetermined distance (e.g., stored in memory device 104) from one or more other mobile computing devices. A speed of the mobile computing device is determined (304). One or more functions of the mobile computing device are restricted when the device claims the operator token and has a speed that exceeds a predetermined threshold value.

In yet another aspect, a computer readable storage device (e.g., memory device 104) has processor readable instructions stored thereon including instructions that, when executed by a processor (e.g., processor(s) 102), implement a method of allowing computing device functions. The method includes receiving a designated operator token from an operator beacon (e.g., operator beacon 204) and designating a user of the mobile computing device as a passenger in response to the receiving. All functions of the mobile computing device are allowed in response to the passenger designation.

In another aspect, a computer readable storage device (e.g., memory device 104) has processor readable instructions stored thereon including instructions that, when executed by a processor (e.g., processor(s) 102), implement a method of restricting computing device functions. The method includes creating a group (308) from a plurality of mobile computing devices that are each within a predetermined distance of each other. One or more screens are presented (314, 318) via electronic display devices (e.g., electronic visual displays 108) of the mobile computing devices. The screens are configured to claim an operator token. One or more functions of one of the mobile computing devices of the group are restricted when the device claims the operator token within a predetermined time threshold (e.g., stored in memory device 104) of the group creation and the device has a speed that exceeds a predetermined speed threshold value (e.g., stored in memory device 104). The method includes restricting one or more functions of each of the devices of the group when the operator token is unclaimed after expiration of the predetermined time threshold. In one form, the functions include executing a messaging application by a processor (e.g., processor(s) 102) of the mobile computing devices, executing a music application by the processor of the mobile computing devices, and displaying visual information by an electronic visual display (e.g., electronic visual display 108) of the mobile computing devices.

In yet another aspect, a system includes one or more mobile computing devices and one or more server computing devices that are communicatively coupled to each other by a communications network. The mobile computing devices include an electronic visual display (e.g., electronic visual display 108), a communications subsystem (e.g., wireless communications subsystem 112), a mobile processor (e.g., processor(s) 102), and a mobile memory device (e.g., memory device 104). The mobile processor is communicatively coupled to the electronic visual display and the communications subsystem. The mobile memory device stores processor-executable restriction instructions that, when executed by the mobile processor, configure the processor to restrict one or more functions of the mobile computing device when a user of the device is designated as a vehicle operator and a speed of the device exceeds a predetermined threshold value (e.g., stored in memory device 104). The server computing devices include a server processor and a server memory device. The server memory device stores processor-executable facilitation and tracking instructions that, when executed by the server processor, configure the server computing device to facilitate designation of the user of one of the mobile computing devices as the vehicle operator and track compliance of the one or more mobile computing devices storing and executing the restriction instructions.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method, comprising:
   claiming, by a mobile computing device, an operator token when the mobile computing device is more than a predetermined distance from one or more other mobile computing devices;
   determining a speed of the mobile computing device; and
   restricting one or more functions of the mobile computing device when the device claims the operator token and has a speed that exceeds a predetermined threshold value.

2. The method of claim 1, wherein the one or more functions include executing a messaging application, executing a social media application, executing a music application, and displaying visual information by an electronic visual display of the mobile computing device.

3. The method of claim 2, wherein said restricting the display of visual information comprises obfuscating the display of visual information by the electronic visual display.

4. The method of claim 3, wherein said obfuscating the display of visual information comprises progressively increasing the obfuscation as the determined speed of the mobile computing device increases.

5. The method of claim 3, wherein said obfuscating the display of visual information comprises at least one of:
   overlaying a gray screen atop the display of visual information, wherein the gray screen has a variable translucency ranging from transparent to opaque as a function of the speed of the mobile computing device; and
   overlaying a predetermined, user-defined image atop the display of visual information, wherein the predetermined, user-defined image has a variable translucency ranging from transparent to opaque as a function of the speed of the mobile computing device.

6. The method of claim 3, wherein said obfuscating the display of visual information comprises displaying a restricted functionality graphical user interface (GUI) by the electronic visual display, wherein the restricted GUI comprises at least one element selected from an emergency call button, one or more media preset buttons, a navigation display, and combinations thereof.

7. The method of claim 1, wherein said claiming comprises determining the distance of the mobile computing device from the one or more other mobile computing devices via a radio frequency transceiver of the mobile computing device configured to operate according to at least one of a Bluetooth protocol, a Wi-Fi protocol, a cellular protocol, and a GPS protocol, and wherein said determining the speed of the mobile computing device comprises determining the speed via the radio frequency transceiver configured to operate according to at least one of the Bluetooth protocol, the Wi-Fi protocol, the cellular protocol, and the GPS protocol.

8. A computer readable storage device having processor readable instructions stored thereon including instructions that, when executed by a processor, implement a method, comprising:
   claiming an operator token when the mobile computing device is more than a predetermined distance from one or more other mobile computing devices;

determining a speed of the mobile computing device; and restricting one or more functions of the mobile computing device when the device claims the operator token and has a speed that exceeds a predetermined threshold value.

9. The computer readable storage device of claim 8, wherein the one or more functions include executing a messaging application, executing a social media application, executing a music application, and displaying visual information by an electronic visual display communicatively coupled to the processor.

10. The computer readable storage device of claim 9, wherein said restricting the display of visual information comprises obfuscating the display of visual information by the electronic visual display.

11. The computer readable storage device of claim 10, wherein said obfuscating the display of visual information comprises progressively increasing the obfuscation as the determined speed of the mobile computing device increases.

12. The computer readable storage device of claim 10, wherein said obfuscating the display of visual information comprises at least one of:
   overlaying a gray screen atop the display of visual information, wherein the gray screen has a variable translucency ranging from transparent to opaque as a function of the speed of the mobile computing device; and
   overlaying a predetermined, user-defined image atop the display of visual information, wherein the predetermined, user-defined image has a variable translucency ranging from transparent to opaque as a function of the speed of the mobile computing device.

13. The computer readable storage device of claim 10, wherein said obfuscating the display of visual information comprises displaying a restricted functionality graphical user interface (GUI) by the electronic visual display, wherein the restricted GUI comprises at least one element selected from an emergency call button, one or more media preset buttons, a navigation display, and combinations thereof.

* * * * *